United States Patent
Xiao et al.

(10) Patent No.: US 6,306,985 B1
(45) Date of Patent: Oct. 23, 2001

(54) HIGH ACTIVITY SOLID CATALYST FOR PRODUCING LOW-, MEDIUM-, AND HIGH-DENSITY POLYETHYLENES BY SLURRY PHASE POLYMERIZATION, PROCESS FOR PREPARING THE SAME AND USE OF THE SAME IN ETHYLENE POLYMERIZATION

(75) Inventors: Mingwei Xiao; Shijiong Yu; Xiaofeng Ye, all of Shanghai (CN)

(73) Assignee: China Petrochemical Corporation, Shanghai (CN)

( * ) Notice: Subject to any disclaimer, the term of this patent is extended or adjusted under 35 U.S.C. 154(b) by 0 days.

(21) Appl. No.: 09/352,873

(22) Filed: Jul. 13, 1999

(51) Int. Cl.$^7$ ........................................................ C08F 4/64
(52) U.S. Cl. .................. 526/158; 526/124.1; 526/124.2; 526/124.3; 526/348; 502/115; 502/227; 502/250
(58) Field of Search ............................ 526/124.1, 124.2, 526/124.3, 158, 348; 502/115, 227, 250

(56) References Cited

U.S. PATENT DOCUMENTS 5,194,531 * 3/1993 Toda et al. ............................ 526/125

FOREIGN PATENT DOCUMENTS 93118601.3   1/1994  (CN) .
93103264.4   10/1994 (CN) .
51-64586  *  6/1995  (JP) .
93112345.3 *  6/1995  (CN) .

* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

Disclosed is a high activity solid catalyst for synthesizing low-, medium- and high-density polyethylenes by a slurry phase process, prepared by using commercial powered magnesium as raw material, forming a magnesium halide in the nascent state, followed by successively treating said magnesium halide with an alcohol compound and an alkyl aluminum compound, then reacting the resulting suspension of the spheroidal, porous solid complex carrier with a titanium compound in the presence of an electron donor compound an alkyl aluminum compound to obtain a main catalyst component and finally mixing the catalyst component with an organometallic compound as cocatalyst. The catalyst according to the present invention is characterized by a simple preparation procedure, high polymerization activity, high sensitivity to the modification by hydrogen, high copolymerization power and smooth and stable polymerization reaction when used for slurry phase polymerizing ethylene, and the products thus obtained have good particle morphology.

19 Claims, 2 Drawing Sheets

HIGH ACTIVITY SOLID CATALYST FOR PRODUCING LOW-, MEDIUM-, AND HIGH-DENSITY POLYETHYLENES BY SLURRY PHASE POLYMERIZATION, PROCESS FOR PREPARING THE SAME AND USE OF THE SAME IN ETHYLENE POLYMERIZATION

FIELD OF THE INVENTION

The present invention relates to a high activity solid catalyst suitable for slurry phase polymerization of ethylene, a process for preparing the same and use of the same in ethylene polymerization.

BACKGROUND OF THE INVENTION

Since the successful development of high activity catalysts for polyethylene in 1970's, there are siginificant changes in the polyethylene industry. In recent 20 years, there has been rapid progress with respect to the researches into the catalysts for ethylene polymerization and three systems in terms of the composition of the catalysts, i.e. chromium type high activity catalysts, Ziegler-Natta type Mg-Ti high activity catalysts and metallocene type catalysts, have been formed. Among them, Mg-Ti high activity catalysts are very important in the field of catalysts for polyethylene due to their excellent performance. The processes for preparing them have been developed from the co-grinding process as well as the suspending-impregnating process to the advanced chemical reaction process utilized at present, and in this regard, there are many patents issued. However, these patents owned by different companies are largely different and each of them possesses advantages and disadvantages.

For example, Japanese Patent Application Laid-open No. Sho 51-64586 discloses a catalyst for polymerizing olefins, comprising a solid catalyst component (A), prepared by reacting metal magnesium with an alkyl halide in the presence of an electron donor compound to form a magnesium compound having a ratio of halogen/magnesium of 1–2 and containing no magnesium-carbon bond, reacting said magnesium compound with an organometallic compound or halide of Group III metal of the Period Table, and then reacting the resulting product with a titanium compound, and an organometallic compound of Group I–III metal of the Period Table, in which titanium is substantially tetravalent. The application specifically describes in the Examples that small amount of ethanol or other alcohols is used as the electron donor compound so as to facilitate the reaction between metal magnesium and n-butyl chloride to form white precipitate. The disadvantage of the catalyst is that during the preparation of the solid catalyst component (A), it is necessary to use titanium tetrachloride in an amount largely higher than that to be supported, which give rises a low rate for supporting titanium and leads to equipment errosion.

Chinese Patent Application No 93118601.3 discloses a titanium catalyst component, prepared by reacting anhydrous magnesium chloride with an alcohol compound containing at least 6 carbon atoms, such as 2-ethylhexanol, to form a uniform solution, to which is added an organic aluminum compound to form a precipitate, and then impregnating said precipitate with large amount of titanium tetrachloride, in which titanium is substantially tetravalent. The titanium catalyst component has higher catalytic activity when used for polymerizing ethylene, and the products obtained have uniform partice size and high bulk density. However, during the preparation of the titanium catalyst component, it is required that the magnesium compound be dissolved at elevated temperature of 120–140° C. and higher alkane solvent such as decane be used in large amount, which results in high cost and there is a problem with respect to the recovery of the solvent. In addition, it is necessary to use titanium tetrachloride in an amount largely higher than that to be supported during the supporting of titanium, which leads to equipment errosion.

Chinese Patent Application No. 93103264.4 discloses a process for process for preparing a catalyst component containing titanium, comprising the step of dissolving magnesium chloride in a mixture of an organic phosphate and an alcohol to form a uniform solution, to which a titanium compound is added in the presence of a coprecipitator such as an organic carboxylic anhydride to precipitate the catalyst component. The catalyst obtained according to this process is characterized in high catalytic activity, excellent properties of the resultant polymer products, low amount of solvent used and improved productivity. However, during the preparation of the catalyst component, it is required that the temperature at which the solution of magnesium compound is mixed and reacted with the solution of titanium tetrachloride be from −5° C. to 10° C., which is a severe operation condition and is not suitable for production and application in industrial scales.

The present inventors proposed a catalyst in Chinese Patent Application No. 93112345.3, which is prepared by using powdered magnesium as raw material to form a complexed magnesium halide carrier having reducing capability and then supporting active components onto said carrier by impregnating, with more than 80% of titanium being trivalent. Said catalyst is advantageous for a simple preparing procedure, suitable initial activity of polymerization reaction, smooth and stable reaction, high catalytic activity, good morphology of the resulting polymer particles and lack of fine particles. However, as a catalyst for producing polyethylene by a slurry phase process, the catalyst is insufficient in its catalytic activity.

SUMMARY OF THE INVENTION

In view of the above, the present inventors conducted extensive and intensive research with a view to obtain a novel catalyst for slurry phase polymerizing ethylene. As a result, it is found that novel catalyst for polymerizing ethylene can be prepared by using commercial powdered magnesium as raw material, forming a magnesium halide in the nascent state, then successively reacting said magnesium halide with an alcohol compound and an alkyl aluminum compound to form a suspension of spheroidal, porous solid complex carrier, which is reacted with a titanium compound in the presence of an electron donor compound and an alkyl aluminum compound to form a main catalyst component, and finally mixing said main catalyst component with an organometallic compound as cocatalyst. The catalyst according to the present invention is characterized in a simple preparing procedure, high polymerization activity, high sensitivity to the modification by hydrogen, high copolymerization power, smooth and stable polymerization reaction and good morphology of the resulting polymer particles.

Therefore, an object of the present invention is to provide a high activity solid catalyst suitable for slurry phase polymerizing ethylene, which is free of the above disadvantages associated with the prior catalysts.

Another object of the present invention is to provide a process for preparing the catalyst according to the present invention.

Still another object of the present invention is to provide a process for slurry phase polymerizing ethylene.

These and other objects, features and advantages of the present invention will be apparent to those skilled in the art from the following detailed description taken in connection with the appended claims.

DETAILED DESCRIPTION OF THE INVENTION

The present invention in its one aspect provides a high activity solid catalyst for slurry phase polymerizing ethylene, comprising A) a main catalyst component containing titanium, obtained by reacting powdered magnesium with an alkyl halide in a hydrocarbon solvent, optionally in the presence of a first electron donor compound, to form a magnesium halide in the nascent state, followed by successively treating said magnesium halide with an alcohol compound and an alkyl aluminum compound, then reacting the resulting suspension of the spheroidal, porous solid complex carrier with a titanium compound in the presence of a second electron donor compound and an alkyl aluminum compound, wherein said first and second electron donor compounds are organic compounds containing at least one atom of oxygen, sulfur, nitrogen, silicon or phosphorus; and B) an organometallic compound as cocatalyst;
    wherein the ratio of the cocatalyst to the main catalyst component, in terms of the molar ratio of the metal contained in component B) to titanium contained in component A), is 20–400:1.

The present invention in its another aspect provides a process for preparing the catalyst according to the present invention.

The present invention in its third aspect provides a process for slurry phase polymerizing ethylene.

The preparation procedure for the catalyst according to the present invention is described as follows.

(1) Preparation of magnesium halide in the nascent state

Under an atmosphere of nitrogen, commercial powdered magnesium is reacted with an alkyl halide(RX) in a hydrocarbon solvent at a temperature of 10–100° C., preferably 20–80° C. for from 0.5 to 10 hours, preferably from 1 to 8 hours, to obtain a magnesium halide in the nascent state. The alkyl halide can be added either at one time or by dropwise.

The above reaction may also be carried out in the presence of a first electron donor compound $ED_1$. The first electron donor compound used in the above reaction may be an organic compound containing at least one atom of oxygen, sulfur, nitrogen, silicon or phosphorus. Suitable examples of the first electron donor compound may include aliphatic or aromatic ethers, esters, amines and the like, each containing from 3 to 8 carbon atoms, such as diethyl ether, tetrahydrofuran, ethyl acetate, ethyl benzoate, tributyl phosphte, N, N-dimethylformamide and the like.

Figure 1:
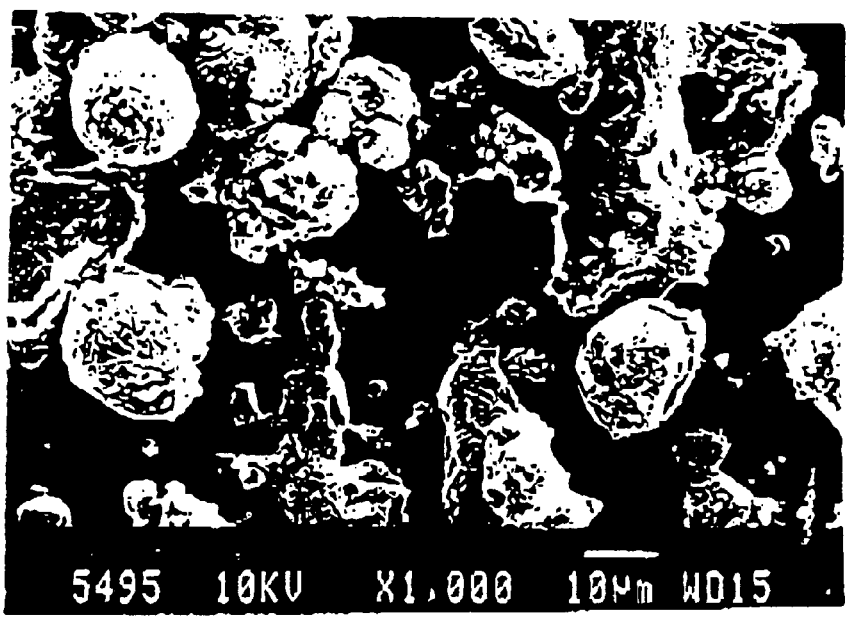
FIG. 1 is a scanning electron microscopic(SEM) image of the catalyst particles subjected to surface-treatment (magnification: 1,000)

The magnesium halide in the nascent state formed in the above reaction has uniform particle size and is spheroidal (see FIG. 1). The magnesium halide in nascent state may be represented by the following formula:

wherein R is an alkyl group containing from 3 to 12 carbon atoms, X is halogen, preferably chlorine and p: q: t is (0–1.0): 1.0: (0–2.0) (by mole), preferably (0.05–0.8): 1.0: (0–1.0) (by mole).

The hydrocarbon solvent used in the above reaction may be aliphatic hydrocarbons, cycloaliphatic hydrocarbons or aromatic hydrocarbons, such as n-pentane, iso-pentane, cyclopentane, cyclohexane, benzene and the like, with aliphatic hydrocarbons containing from 5 to 10 carbon atoms being preferred.

The alkyl halide(RX) used in the above reaction may be n-propyl chloride, n-butyl chloride, isobutyl chloride, isopentyl chloride and the like, and it may be used in such an amount that the molar ratio of RX to Mg is from 1.6 to 2.4, preferably 1.8 to 2.0.

(2) Treatment of magnesium halide in the nascent state

Under an atmosphere of nitrogen and stirring an alcohol compound(R'OH)is added to the magnesium halide in the nascent state as prepared in the above step (1) as a temperature of 10–100° C., and the mixture thus obtained is reacted for 0.5–8 hours, preferable 1–6 hours. The alcohol compound may be added either at one time or by dropwise Upon completion of the reaction, a viscous, brown-black suspension is formed.

The alcohol compound(R'OH) used in the above treatment may be an aliphatic alcohol containing from 3 to 12 carbon atoms, such as methanol, ethanol, 2-methylpentanol, 2-ethylbutanol, 2-ethylhexanol and the like. The alcohol compound may be used in such an amount that the molar ratio of R'OH to Mg is 0.2–6:1, preferably 0.5–6.0:1.

To the suspension thus obtained is then added an alkyl aluminum compound and the resulting mixture is reacted at a temperature of 20–100° C., preferably 30–90° C., frp 0.5–8 hours, preferably 1–6 hours. The alkyl aluminum compound can be added either at one time or by dropwise. The viscous suspension is gradually thinned as the alkyl, aluminum compound is added and the reaction progresses, and finally a suspension of dark grey solid having excellent particle morphology is formed. The dark grey solid is a complex carrier comprising magnesium, aluminum, halogen, alkoxy group and the like. The alkyl aluminum compound used in the above reaction may be triethyl aluminum, triisopropyl aluminum, triisobutyl aluminum, tri-n-octyl aluminum, tri(2-ethyl)hexyl aluminum, diethyl aluminum chloride, ethyl aluminum dichloride, diisopropyl aluminum chloride, ethyl aluminum sesquichloride, butyl aluminum sesquichloride and the like, and is used in such an amount that the molar ratio of R'OH to Al is 0.2–7:1, preferably 0.5–5:1.

(3) Preparation of the main catalyst component containing titanium

This is the most important step for preparing the catalyst according to the present invention. Under an atmosphere of nitrogen, a titanium compound is added to the suspension of the complex carrier as prepared in the above step (2), in the presence of a second electron donor compound and an alkyl aluminum compound. The titanium compound can be added either at one time or by dropwise. The resulting mixture is then reacted at a temperature of 20–90° C., preferably 30–60° C., for 1–10 hours, preferably 2–8 hours. The second electron donor compound $ED_2$, the alkyl aluminum compound, the titanium compound and the complex carrier are used in such amounts that the molar ratio of $ED_2$: Al: Ti:

Mg is (0.5–3.0): 1: (0.5–5.0)(2.0–10.0). Upon the completion of the reaction, a brown-black suspension of a main catalyst component is formed, which has the following composition(by mole): $Ti^{3+}$: $Ti^{total}$: Mg: X=(0.5–1.0): 1.0: (2.0–10.0): (4.0–25).

The second electron donor compound ($ED_2$) used in the above reaction may be an organic compound containing at lest one atom of oxygen, sulfur, nitrogen, silicon or phosphorus. Suitable examples of the second electron donor compound may include aliphatic or aromatic ethers, esters, amines and the like, each containing from 3 to 8 carbon atoms, such as diethyl ether, tetrahydrofuran ethyl acetate, ethyl benzoate, tributyl phosphate, N, N-dimethylformamide and the like. The above electron donor compounds can be used alone or in combinations thereof.

The alkyl aluminum compound used in the above reaction may be triethyl aluminum, triisopropyl aluminum, triisobutyl aluminum, tri-n-octyl aluminum, tri-(2-ethyl)hexyl aluminum, diethyl aluminum chloride, ethyl aluminum dichloride, diisopropyl aluminum chloride, ethyl aluminum sesquichloride, butyl aluminum sesquichloride and the like.

The titanium compound used in the above reaction may be a compound represented by the following formula:

$$Ti(OR")_m Cl_{4-m}$$

wherein R" is an alkyl group containing 3 or 4 carbon atoms and m i an integer of from 0 to 4; and the specific examples thereof may be titanium tetrachloride, butyl titanate, methoxy titanium trichloride, butoxy titanium trichloride and the like.

The high activity catalyst for polyethylene according to the present invention is consisted of the main catalyst component as prepared in the above and a cocatalyst. The cocatalyst may be an organometallic compound selected from the group consisting of organic zinc compounds, organic magnesium compounds, organic aluminum compounds, such as triethyl aluminum, diethyl aluminum chloride, triisobutyl aluminum, trihexyl aluminum, diethyl zinc and the like, with organic aluminum compounds being preferred. The cocatalyst may be used in such an amount that the molar ratio of the metal contained in the cocatalyst to titanium contained in the main catalyst component is 20–400: 1, preferably 30–300:1.

The high activity catalyst according to the present invention can be directly used for slurry phase polymerizing ethylene at a temperature of 50–100° C., preferably 60–90° C. and at a total pressure of 0.7–4.0 MPa, to obtain low-, medium- and high-density polyethylenes.

The term "ethylene polymerization", as used herein, means ethylene homopolymerization and ethylene copolymerization with other comonomers. For example, for producing low density polyethylenes, a comonomer is usually used to regulate the density of the product. The comonomers usually utilized may be aliphatic α-olefins containing from 3 to 8 carbon atoms. Suitable examples of the α-olefins are propylene, butene-1, pentene-1, hexene-1, 4-methylpentene-1, heptene-1 or octene-1, preferably butene-1 or hexene-1. The polyethylene products obtained by incorporating such a comonomer can have a density ranging the 0.910 to 0.960 g/cm³.

A chain transfer agent such as hydrogen or diethyl zinc can be used during the polymerization so as to regulate the melt index of polyethylenes. The amount of hydrogen may be regulated in a range of from 10 to 95%, on the basis of the total volume of the charged gases, so that polyethylenes having a melt index 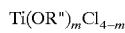 $Ml_{2.16}$ ranging from 0 to 300 g/10 minutes can be obtained. The high activity solid catalyst for polyethylenes according to the present invention has high polymerization activity, usually from $3×10^5$ to $9×10^5$ g polyethylene/g Ti(polymerized at 80° C. and 0.8 MPa for 4 hours) and the polyethylene has higher bulk density(>0.30 g/cm³).

Figure 2:
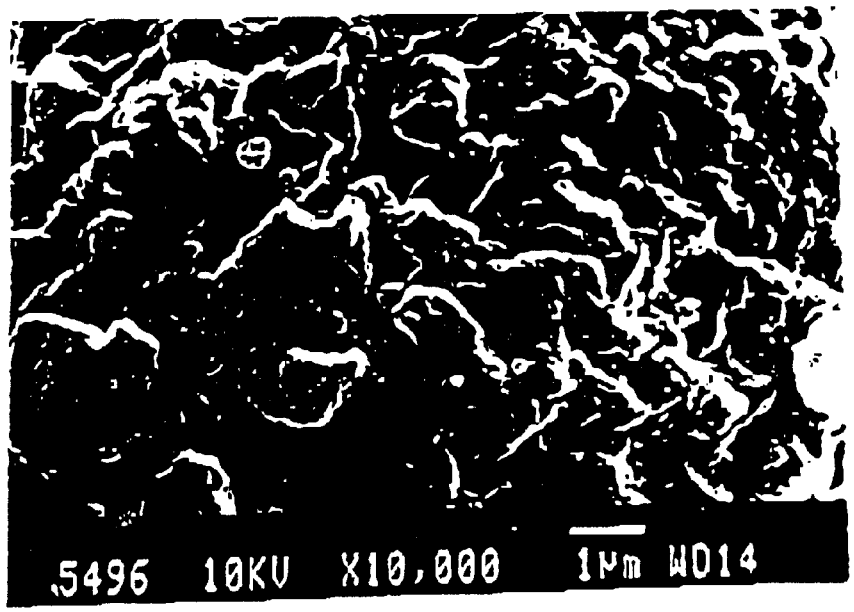
FIG. 2 is a SEM image of the surface state of the catalyst particles in FIG. 1 (magnification: 10,000)
Figure 3:
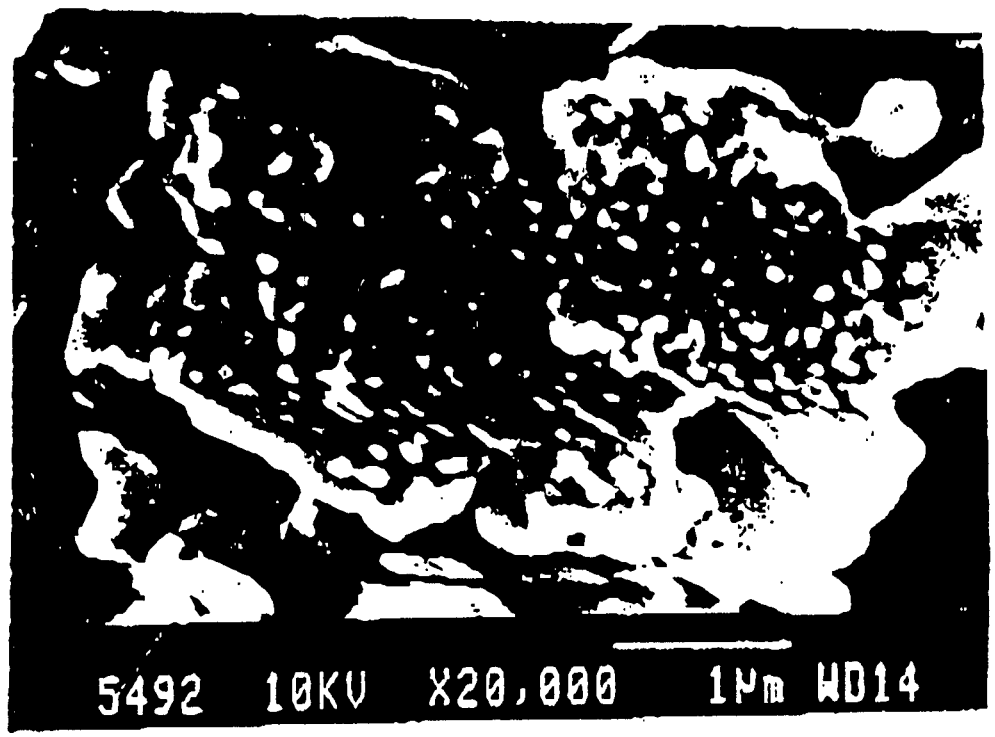
FIG. 3 is a SEM image of the catalyst particles not subjected to surface-treatment (magnification: 20,000).

The high activity solid catalyst for polyethylenes according to the present invention possesses the following advantages:

1. The catalyst can be prepared in a simple manner and the operation conditions are not severe, thus is suitable for production and application in an industrial scale.
2. By treating the magnesium halide in the nascent state formed during the catalyst preparation with an alcohol compound and an alkyl aluminum compound, there is formed a spheroidal, porous solid complex carrier having more lattice defects and uniform particle size (see FIGS. 1 and 2), which leads to polymers having uniform particle size, higher bulk density and free of fine particles larger than 200 mesh when used for polymerizing ethylene.
3. Higher rate for supporting titanium can be obtained by using only small amount of the titanium compound due to the formation of the above solid complex carrier and the use of the second electron donor compound. Therefore, not only the equipment errosion caused by using large amount of titanium compound for supporting in the practical production can be overcome, but also the difficulties for post-treatment are alleviated.
4. Polymerization reaction is smooth and stable, the polymerization temperature is easy to control and there is no kettle adhesion when employing the catalyst according to the present invention.
5. The catalyst according to the present invention has excellent performance, high sensitivity to the modification by hydrogen and high copolymerization power.

The following examples are used to illustrate the present invention and by no means intended to limit the scope thereof.

EXAMPLE 1

(a) Preparation of the main catalyst component

A dried, round-bottom glass reactor equiped with a stirrer, a condenser and a dropping funnel is completely purged with nitrogen. Under an atmosphere of nitrogen, to the reactor are added 300 ml of n-hexane and 6.5 g of powdered magnesium, and then 70 ml n-butyl chloride is slowly added under stirring at 20° C. Upon completion of the addition, the resulting mixture is heated to a temperature 40° C. and reacted at that temperature for 8 hours to form a suspension of solid magnesium halide in the nascent state, having a formula of $MgCl_2(MgBuCl)_{0.45}$. The temperature of the suspension is then raised to 60° C., to which 45 ml of anhydrous ethanol is slowly added under stirring. Upon completion of the addition, the resulting mixture is reacted at that temperature of 2hours. Then 37 ml of triethyl aluminum is slowly added under stirring at that temperature and upon completion of the addition, the resulting mixture is reacted at that temperature for 4 hours to form a suspension of dark grey solid. To the resulting suspension are added 6 ml of tetrahydrofuran and 4.1 ml of diethyl aluminum chloride and then 6.3 g of titanium tetrachloride is slowly added under stirring at 60° C. Upon completion of the addition, the resulting mixture is reacted at that temperature for 4 hours and then is cooled to room temperature and washed three times with n-hexane. 250 ml of slurry containing the main catalyst component is obtained. By analyzing the slurry, it is found that it contains $Ti^{3+}$ 0.108 mmol/ml, $Ti^{total}$ 0.126 mmol/ml, Mg 0.895 mmol/ml and Cl 0.1966 mmol/ml. Therefore, the main catalyst component has the following composition: $Ti^{3+}$: $Ti^{total}$: Mg: Cl=0.86:1.0:7.1:15.6 (by mole) and the rate for supporting titanium(the molar ratio of total titanium to titanium added) is as high as 95%.

(b) Polymerization

A 2-liter stainless reactor is completely purged with high purity nitrogen. Thereafter, to the reactor are added 1200 ml of dried, industrial grade n-hexane, 15 ml of dried, high purity hexane-1, 3.0 mmol of triethyl aluminum as cocatalyst and 0.0097 mmol(as calculated by Ti) of the main catalyst component as prepared in the above step (a). Hydrogen is fed to the reactor until a gauge pressure of 0.2 MPa is reached and then ethylene is fed until a total pressure of 0.8 MPa is reached. The reactor is heated to a temperature of 80° C. and polymerization is carried out at that temperature for 4 hours. 301 g polyethylene as white solid is obtained. After calculation, the catalyst efficiency is 64.9×$10^4$ g polyethylene/g Ti, and the polyethylene thus obtained has a melt index $Ml_{2.16}$ of 4.4 g/10 minutes, a density of 0.940 g/cm$^3$ and a bulk density of 0.326 g/cm$^3$.

EXAMPLE 2

(a) Preparation of the main catalyst component

A dried, round-bottom glass reactor equiped with a stirrer, a condenser and a dropping funnel is completely purged with nitrogen. Under an atmosphere of nitrogen, to the reactor are added 300 ml of n-hexane, 6.5 g of powdered magnesium and 7 ml of tetrahydrofuran(THF), and then 56 ml n-butyl chloride is slowly added under stirring at 20° C. and reacted at that temperature for 8 hours to form a suspension of solid magnesium halide in the nascent stat, having a formula of $MgCl_2(MgBuCl)_{0.50}(THF)_{0.48}$. The temperature of the suspension is then raised to 60° C., to which 45 ml of anhydrous ethanol is slowly added under stirring. Upon completion of the addition, the resulting mixture is reacted at that temperature for 2 hours. Then 37 ml of triethyl aluminum is slowly added under stirring at that temperature and upon completion of the addition, the resulting mixture is reacted at that temperature for 4 hours to form a suspension of dark grey solid. To the resulting suspension are added 6 ml of tetrahydrofuran and 4.1 ml of diethyl aluminum chloride and then 6.3 of titanium tetrachloride is slowly added under stirring at 60° C. Upon completion of the addition, the resulting mixture is reacted at that temperature for 4 hours and then is cooled to room temperature and washed three times with n-hexane. 250 ml of slurry containing the main catalyst component is obtained. By analyzing the slurry, it is found that it contains $Ti^{3+}$ 0.114 mmol/ml, $Ti^{total}$ 0.126 mmol/ml, Mg 0903 mmol/ml and Cl 1.931 mmol/ml. Therefore, the main catalyst component has the following composition: $Ti^{3+}$: $Ti^{total}$: Mg: Cl=0.90:1.0:7.2:15.3 (by mole) and the rate for supporting titanium(the molar ratio of total titanium to titanium added) is as high as 95%.

(b)Polymerization

A 2-liter stainless reactor is completely purged with high purity nitrogen. Thereafter, to the reactor are added 1200 ml of dried, industrial grade n-hexane, 4.4 mmol of triethyl aluminum as cocatalyst and 0.01455 mmol(as calculated by Ti) of the main catalyst component as prepared in the above step (a). Hydrogen is fed to the reactor until a gauge pressure of 0.2 MPa is reached and then ethylene is fed until a total pressure of 0.8 MPa i reached. The reactor is heated to a temperature of 80° C. and polymerization is carried out at that temperature for 4 hours. 330 g polyethylene as white solid is obtained. After calculation, the catalyst efficiency is 47.3×$10^4$ g polyethylene/g Ti, and the polyethylene thus obtained has a melt index $Ml_{2.16}$ of 3.2 g/10 minutes, a density of 0.960 g/cm$^3$ and a bulk density of 0.341 g/cm$^3$.

EXAMPLE 3

The procedure of Example 1 is followed except that during the treatment of the magnesium halide in the nascent state, the amount of anhydrous ethanol is changed from 45 ml to 90 ml. The slurry of the main catalyst component has the following composition: $Ti^{3+}$: $Ti^{total}$: Mg: Cl=0.95:1.0:7.5:16.0 (by mole). are summarized in table 1.

EXAMPLE 4

The procedure of Example 1 is followed except that during the treatment of the magnesium halide in nascent state, the amount of triethyl aluminum is changed from 37 ml to 30 ml and the resulting mixture after addition of triethyl aluminum is reacted for 6 hours instead of 4 hours. The slurry of the main catalyst component has the following composition: $Ti^{3+}$: $Ti^{total}$: Mg: Cl=0.80:1.0:7.3:15.9 (by mole). The polymerization results are summarized in table 1.

EXAMPLE 5

The procedure of Example 1 is followed except that during the supporting of the titanium compound, the amount of titanium tetrachloride is changed from 6.3 g to 5 g and the reaction temperature is changed from 60° C. to 80° C. The slurry of the main catalyst component has the following composition: $Ti^{3+}$: $Ti^{total}$: Mg: Cl=0.91:1.0:9.3:19.4(by mole.) The polymerization results are summarized in table 1.

EXAMPLE 6

The procedure of Example 1 is followed except that during the supporting of the titanium compound, the second electron donor compound is 18 ml tributyl phosphate instead of tetrahydrofuran. The slurry of the main catalyst component has the following composition: $Ti^{3+}$: $Ti^{total}$: Mg: Cl=0.88:1.0:7.3:15.7(by mole). The polymerization results are summarized in table 1.

TABLE 1

| Example No | Amount of $H_2$, MPa | Amount of Ethylene, MPa | Catalyst Efficiency, ×$10^4$ g Polyethylene /g Ti | Density, g/cm$^3$ | $Ml_{2.16}$, g/10 min. | Bulk Density, g/cm$^3$ |
|---|---|---|---|---|---|---|
| 3 | 0.20 | 0.60 | 49.7 | 0.943 | 1.8 | 0.336 |
| 4 | 0.20 | 0.60 | 45.7 | 0.942 | 3.2 | 0.321 |
| 5 | 0.20 | 0.60 | 55.7 | 0.947 | 2.7 | 0.347 |
| 6 | 0.20 | 0.60 | 60.3 | 0.937 | 3.8 | 0.351 |

EXAMPLE 7

The procedure of Example 1 is followed except that the amounts of hydrogen and ethylene are changed as indicated in table 2. The polymerization results are summarized in table 2.

TABLE 2

| Experi-Ment No. | Amount of $H_2$, MPa | Amount of Ethylene, MPa | Catalyst Efficiency, $\times 10^4$ g Polyethylene /g Ti | Density, g/cm$^3$ | $MI_{2.16}$, g/10 min. | Bulk Density, g/cm$^3$ |
|---|---|---|---|---|---|---|
| 7-1 | 0    | 0.80 | 97.1 | 0.941 | 0      | 0.346 |
| 7-2 | 0.10 | 0.70 | 77.4 | 0.938 | 0.40   | 0.345 |
| 7-3 | 0.38 | 0.42 | 39.6 | 0.945 | 15.72  | 0.315 |
| 7-4 | 0.48 | 0.32 | 28.7 | 0.943 | 24.30  | 0.318 |
| 7-5 | 0.60 | 0.20 | 19.6 | 0.944 | 241.20 | 0.310 |
| 7-6 | 0.70 | 0.10 | 10.0 | 0.942 | 526.00 | 0.304 |

EXAMPLE 8

The procedure of Example 1 is followed except that the amount of 1-hexene is changed as indicated in table 3. The polymerization results are summarized in table 3.

TABLE 3

| Experi-ment No. | Amount of 1-Hexene, ml | Ethylene/ Hydrogen, MPa/MPa | Catalyst Efficiency, $\times 10^4$ g Polyethylene /g Ti | Density, g/cm$^3$ | $MI_{2.16}$, g/10 min. | Bulk Density, g/cm$^3$ |
|---|---|---|---|---|---|---|
| 8-1 | 0  | 0.60/0.20 | 49.6 | 0.958 | 3.2 | 0.357 |
| 8-2 | 10 | 0.60/0.20 | 52.3 | 0.945 | 3.7 | 0.348 |
| 8-3 (Ex. 1) | 15 | 0.60/0.20 | 64.9 | 0.940 | 4.4 | 0.326 |
| 8-4 | 30 | 0.60/0.20 | 72.5 | 0.932 | 4.8 | 0.334 |
| 8-5 | 40 | 0.60/0.20 | 82.7 | 0.928 | 5.7 | 0.329 |
| 8-6 | 50 | 0.60/0.20 | 79.3 | 0.920 | 6.0 | 0.319 |

EXAMPLE 9

The procedure of Example 2 is followed except that the second electron donor compound used in the step of supporting the titanium compound is changed from tetrahydrofuran to ethyl benzoate(12 ml), and the slurry of the resulting main catalyst component has the following composition: $Ti^{3+}$: $Ti^{total}$: Mg: Cl=0.9: 1.0: 7.9: 16.2 (by mole). The polymerization results are summarized in table 4.

EXAMPLE 10

The procedure of Example 2 is followed except that the second electron donor compound used in the step of supporting the titanium compound is changed from tetrahydrofuran to a mixture of tributyl phosphate and N,N-dimethylformamide (9 ml/3 ml), and the slurry of the resulting main catalyst component has the following composition: $Ti^{3+}$: $Ti^{total}$: Mg: Cl=0.92: 1.0: 7.6: 17.4 (by mole). The polymerization results are summarized in table 4.

TABLE 4

| Example No. | Amount of $H_2$, MPa | Amount of $C_2H_4$, MPa | Catalyst Efficiency, $\times 10^4$ g Polyethylene /g Ti | Density, g/cm$^3$ | $MI_{2.16}$, g/ 10 min. | Bulk Density, g/cm$^3$ |
|---|---|---|---|---|---|---|
| 9  | 0.2 | 0.6 | 38.9 | 0.960 | 1.4 | 0.327 |
| 10 | 0.2 | 0.6 | 40.9 | 0.961 | 0.9 | 0.330 |

EXAMPLE 11

The polymerization is carried out in a manner same as in Example 1 except that the main catalyst component is prepared in a manner same as in Example 2 and the amounts of hydrogen and ethylene are changed as indicated in table 5. The polymerization results are summarized in table 5. In addition, the particle sizes of the resulting polymers are analyzed and the results are summarized in table 6.

TABLE 5

| Experiment No. | Amount of $H_2$, MPa | Amount of $C_2H_4$, MPa | Catalyst Efficiency, $\times 10^4$ g Polyethylene /g Ti | Density, g/cm$^3$ | $MI_{2.16}$, g/ 10 min. | Bulk Density, g/cm$^3$ |
|---|---|---|---|---|---|---|
| 11-1 | 0 | 0.80 | 94.3 | 0.941 | 0 | 0.346 |
| 11-2 | 0.10 | 0.70 | 707 | 0.943 | 1.20 | 0.350 |
| 11-3 | 0.20 | 0.60 | 57.3 | 0.944 | 3.40 | 0.345 |
| 11-4 | 0.40 | 040 | 38.8 | 0.940 | 10.53 | 0.325 |
| 11-5 | 0.52 | 0.28 | 28.9 | 0.946 | 33.70 | 0.318 |
| 11-6 | 0.60 | 0.20 | 17.6 | 0.945 | 32.20 | 0.320 |

TABLE 6

| Experiment No. | Particle size distribution (wt %) | | | | | |
|---|---|---|---|---|---|---|
| | Not pass 20 mesh | 20–40 mesh | 40–75 mesh | 75–100 mesh | 100–200 mesh | Pass 200 mesh |
| 11-1 | 44.7 | 20.7 | 23.8 | 7.9 | 3.4 | 1.3 |
| 11-2 | 53.0 | 17.3 | 20.0 | 5.9 | 2.8 | 0.9 |
| 11-3 | 53.1 | 18.0 | 18.0 | 12.0 | 2.8 | 0.9 |
| 11-4 | 43.6 | 22.9 | 19.8 | 8.0 | 4.7 | 1.2 |
| 11-5 | 39.1 | 21.8 | 24.9 | 9.2 | 3.9 | 1.0 |
| 11-6 | 47.3 | 19.7 | 22.3 | 6.1 | 2.6 | 1.3 |

What is claimed is:

1. A high activity solid catalyst for producing low-, medium- high-density polyethylenes by a slurry phase process, comprising:

(A) a main catalyst component containing titanium, obtained by reacting powdered magnesium with an alkyl halide in a hydrocarbon solvent, optionally in the presence of a first electron donor compound $ED_1$, to form a magnesium halide in the nascent state, followed by successively treating and magnesium halide with an alcohol compound in an alcohol to Mg molar ratio of 0.2–6:1 and an alkyl aluminum compound, then reacting the resulting suspension of the spheroidal, porous solid complex carrier with a titanium compound in the presence of a second electron donor compound $ED_2$ an alkyl aluminum compound, wherein said first and second electron donor compounds are organic compounds containing at least one atom of oxygen, sulfur, nitrogen, silicon or phosphorus; and (B) an organometallic compound as cocatalyst; wherein the ratio of the cocatalyst to the main catalyst component, in terms of the molar ratio of the metal contained in component (B) to titanium contained in component (A), is 20–400:1.

2. The high activity solid catalyst as claimed in claim 1, wherein said alkyl halide is represented by the formula RX and said magnesium halide in nascent state has a structure represented by the following formula:

$$(RMgX)_p(MgX_2)_q(ED_1)_t$$

wherein R is an alkyl group containing from 3 to 12 carbon atoms, X is halogen and p: q: t is (0–1.0); 1.0: (0–2.0)(by mole).

3. The high activity solid catalyst as claimed in claim 2, wherein said alkyl halide is n-propyl chloride, n-butyl chloride, isobutyl chloride or isopentyl chloride and p: q: t is (0.05–0.8): 1.0: (by mole).

4. The high activity solid catalyst as claimed in claim 1, wherein said hydrocarbon solvent is an aliphatic hydrocarbon, a cycloaliphatic hydrocarbon or an aromatic hydrocarbon.

5. The high activity solid catalyst as claimed in claim 4, wherein said hydrocarbon solvent is selected from the group consisting of n-pentane, isopentane, cyclopentane, cyclohexane and benzene.

6. The high activity solid catalyst as claimed in claim 1, wherein said first and second electron donor compounds are diethyl ether, tetrahydrofuran, ethyl acetate, ethyl benzoate, tributyl, phosphate, N, N-dimethylformamide or the mixtures thereof.

7. The high activity solid catalyst as claimed in claim 1, wherein said titanium compound is a compound represented by the following formula:

$$Ti(OR'')_mCl_{4-m}$$

wherein R" is an alkyl group containing 3 or 4 carbon atoms and m is an integer of from 0 to 4; and said alkyl aluminum compound is triethyl aluminum, triisopropyl aluminum, triisobutyl aluminum, tri-n-octyl aluminum, tri-(2-ethyl) hexyl aluminum, diethyl aluminum chloride, ethyl aluminum dichloride, diisopropyl aluminum chloride, ethyl aluminum sesquichloride or butyl aluminum sesquichloride.

8. The high activity solid catalyst as claimed in claim 7, wherein said titanium compound is titanium tetrachloride, butyl titanate, methoxy titanium trichloride or butoxy titanium trichloride.

9. The high activity solid catalyst as claimed in claim 1, wherein said alcohol compound is an aliphatic alcohol having a formula R'OH where R' is an alkyl containing from 3 to 12 carbon atoms.

10. The high activity solid catalyst as claimed in claim 9, wherein said alcohol compound is selected from the group consisting of methanol, ethanol, 2-methylpentanol, 2-ethylbutanol, 2-ethylhexanol and mixtures thereof.

11. The high activity solid catalyst as claimed in claim 9 or 10, wherein in the reaction of said magnesium halide in the nascent state with said alcohol compound and said alkyl aluminum compound, said alkyl aluminum compound is added in such an amount that the molar ratio of R'OH/Al is 0.2–7:1.

12. The high activity solid catalyst as claimed in claim 11, wherein said alcohol compound is added in such an amount that the molar ratio of R'OH/Mg is 0.5–6:1 and said alkyl aluminum compound is added in such an amount that the molar ratio of R'OH/Al is 0.5–5:1.

13. The high activity solid catalyst as claimed in claim 1, wherein in the reaction of said complex carrier with said titanium compound, said second electron donor compound $ED_2$, said alkyl aluminum compound, said titanium compound and said complex carrier are used in such amounts that the molar ratio of $ED_2$: Ti: Mg is (0.5–3.0): (0.5–5.0): 1.0: (2.0–10.0).

14. The high activity solid catalyst as claimed in claim 1, wherein said main catalyst component has such a composition that the molar ratio of $Ti^{3+}$: $Ti^{total}$: Mg: S is (0.5–1.0): 1.0: (2.0–10): (4.0–25).

15. The high activity solid catalyst as claimed in claim 1, wherein said cocatalyst is organic zinc compounds, organic magnesium compounds, organic aluminum compounds or the mixtures thereof.

16. The high activity solid catalyst as claimed in claim 15, wherein said cocatalyst is selected from the group consisting of triethyl aluminum, diethyl aluminum chloride, triisobutyl aluminum, trihexyl aluminum or diethyl zinc.

17. The high activity solid catalyst as claimed in claim 15 or 16, wherein the ratio of the cocatalyst to the main catalyst component, in terms of the molar ratio of the metal contained in component B) to titanium contained in component A), is 30–300:1.

18. A process for preparing any one of the high activity solid catalysts as claimed in claim 1, comprising the following steps:

(1) under an atmosphere of nitrogen and stirring, powdered magnesium is reacted with an alkyl halide in a hydrocarbon solvent, optionally in the presence of a first electron donor compound, at a temperature of 10–100° C., for from 0.5 to 10 hours, to form a magnesium halide in nascent state;

(2) under an atmosphere of nitrogen and stirring, to the magnesium halide as prepared in the above step (1) is added an alcohol compound at a temperature of 10-14 100° C. and the resulting mixture is reacted for from 0.5 to 8 hours to form a viscous, brown-black suspension, to which an alkyl aluminum compound is then added at a temperature of 20–100° C. and the resulting mixture is reacted for from 0.5 to 8 hours to form a dark grey suspension of a spheroidal, porous solid complex carrier comprising magnesium, aluminum, alkoxy group and halogen; said alcohol compound being added in such an amount that the molar ratio of said alcohol compound to magnesium is 0.2–6:1 and said alkyl aluminum compound is added in such an amount that the molar ratio of said alcohol compound is said alkyl aluminum compound is 0.2–7:1;

(3) under an atmosphere of nitrogen and stirring, the complex carrier as prepared in the above step (2) is added to an titanium compound in the presence of a second electron donor compound and an alkyl aluminum compound and the resulting mixture is reached at a temperature of 20–90° C. for 1 to 10 hours to form a main catalyst component, where the molar ratio of said second electron donor compound, said alkyl aluminum compound, said titanium compound and said complex carrier is (0.5–3.0): (0.5–5.0): 1: (2.0–10.0); and (4) mixing the main catalyst component as prepared in the above step (3) with a cocatalyst, wherein the ratio of the cocatalyst to the main catalyst component, in terms of the molar ratio of the metal contained in the cocatalyst to titanium contained in the main catalyst component, is 20–400:1.

19. A process for slurry phase polymerizing ethylene, wherein ethylene, alone or together with other olefins, is polymerized in the presence of the high activity solid catalyst as claimed in claim 1.

* * * * *

UNITED STATES PATENT AND TRADEMARK OFFICE
CERTIFICATE OF CORRECTION

PATENT NO. : 6,306,985 B1 Page 1 of 1
DATED : October 23, 2001
INVENTOR(S) : Xiao et al.

It is certified that error appears in the above-identified patent and that said Letters Patent is hereby corrected as shown below:

<u>Title page,</u>
Item [73], Assignee, should read
-- [73] Assignee: China Petrochemical Corporation, Beijing (CN); Shanghai Research Institute of Chemical Industry SINOPEC UNILAB Shanghai Research Center of Organic Chemistry, Shanghai (CN) --

Signed and Sealed this

Twenty-seventh Day of April, 2004

JON W. DUDAS
*Acting Director of the United States Patent and Trademark Office*